(12) United States Patent
Chen et al.

(10) Patent No.: US 8,508,936 B2
(45) Date of Patent: Aug. 13, 2013

(54) PORTABLE ELECTRONIC DEVICE

(75) Inventors: Dong-Sen Chen, Taipei (TW);
Jen-Hsiang Wang, Taipei (TW);
Chun-Chi Lin, Taipei (TW)

(73) Assignee: Inventec Corporation, Taipei (TW)

( * ) Notice: Subject to any disclaimer, the term of this patent is extended or adjusted under 35 U.S.C. 154(b) by 295 days.

(21) Appl. No.: 13/091,150

(22) Filed: Apr. 21, 2011

(65) Prior Publication Data

US 2012/0170226 A1 Jul. 5, 2012

(30) Foreign Application Priority Data

Jan. 5, 2011 (TW) .............................. 100100375 A

(51) Int. Cl.
*G06F 1/16* (2006.01)
*H01M 2/10* (2006.01)

(52) U.S. Cl.
USPC ................... 361/679.58; 361/679.55; 429/97; 429/100

(58) Field of Classification Search
USPC ............. 361/679.01–679.45, 679.55–679.59; 312/223.1, 223.2; 429/97, 100
See application file for complete search history.

(56) References Cited

U.S. PATENT DOCUMENTS

| 5,607,792 | A * | 3/1997 | Garcia et al. .................... 429/97 |
| 6,115,248 | A * | 9/2000 | Canova et al. ........... 361/679.56 |
| 7,842,412 | B2 * | 11/2010 | Zhang et al. .................... 429/97 |
| 8,205,310 | B2 * | 6/2012 | Shi et al. ......................... 24/637 |
| 8,320,122 | B2 * | 11/2012 | Liu ......................... 361/679.56 |
| 8,345,422 | B2 * | 1/2013 | Chen et al. ............... 361/679.58 |
| 8,351,201 | B2 * | 1/2013 | Chen et al. ............... 361/679.56 |
| 2005/0225933 | A1 * | 10/2005 | Kang et al. .................... 361/679 |
| 2010/0014221 | A1 * | 1/2010 | Shi ........................... 361/679.01 |
| 2010/0130268 | A1 * | 5/2010 | Huang et al. ............... 455/575.1 |

\* cited by examiner

*Primary Examiner* — Jayprakash N Gandhi
*Assistant Examiner* — Nidhi Desai
(74) *Attorney, Agent, or Firm* — CKC & Partners Co., Ltd.

(57) ABSTRACT

A portable electronic device includes a main body, a door and a latch. The main body includes a positioning concave area on a bottom surface thereof. The positioning concave area has a cutout at a first edge, and an inclined surface and a guide edge at an opposite edge. The door is detachably connected with the bottom surface of the main body. The latch is slidably connected with a through hole of the door. The latch has an engaging portion and a guiding portion at two opposite ends. When the door is assembled to the bottom surface of the main body, the engaging portion inserts into the cutout. When the door is taken apart from the bottom surface, the engaging portion is removed from the cutout, and the guiding portion slides along the guide edge to move the door along a direction perpendicular to a long axis of the latch.

9 Claims, 8 Drawing Sheets

PORTABLE ELECTRONIC DEVICE

RELATED APPLICATIONS

This application claims priority to Taiwan Application Serial Number 100100375, filed Jan. 05, 2011 which is herein incorporated by reference.

BACKGROUND

1. Field of Invention

The present invention relates to a door design of a portable electronic device.

2. Description of Related Art

A portable electronic device, e.g. a notebook computer, has multiple removable covers to be easily removed by users or engineers when some components inside the computers need to be replaced or repaired. In a conventional design, these removable covers are fastened to a case of the portable electronic device by means of bolts or screws. If these removable covers are not fastened by means of bolts or screws, at least a latch or the like are needed to fasten them. Each notebook computer is usually equipped with two or more removable covers, each cover needs at least two bolts, screws or latches to secure themselves.

For the companies who manufacture a huge number of notebooks, the costs of bolts, screws or latches are somewhat a large number of costs. For an assembly line of the companies who manufacture a huge number of notebooks, the more components each notebook has, the more labor costs the companies should pay for. All these cost issues should be carefully considered before designing a new notebook computer.

SUMMARY

It is therefore an objective of the present invention to provide an improved door design of a portable electronic device so as to deal with the above-mentioned issues.

In accordance with the foregoing and other objectives of the present invention, a portable electronic device includes a main body, a door and a latch. The main body includes a positioning concave area on a bottom surface thereof. The positioning concave area has a cutout at a first edge, and an inclined surface and a guide edge at a second opposite edge. The door is detachably connected with the bottom surface of the main body. The latch is slidably connected with a through hole of the door. The to latch has an engaging portion at a first end and a guiding portion at a second opposite end. When the door is assembled to the bottom surface of the main body, the engaging portion inserts into the cutout. When the door is taken apart from the bottom surface of the main body, the engaging portion is removed from the cutout, and the guiding portion slides along the guide edge so as to enable the door to move along a direction that is substantially perpendicular to a long axis of the latch.

In an embodiment disclosed herein, the door includes a pair of sliding rails and a bridge member. The pair of sliding rails are located at two opposite sides of the through hole. The bridge member is interconnected between the pair of sliding rails and across the through hole.

In another embodiment disclosed herein, the latch is slidably connected between the pair of sliding rails.

In another embodiment disclosed herein, each of the pair of sliding rails has a block member at an end for preventing the latch from sliding out of the pair of sliding rails.

In another embodiment disclosed herein, the portable electronic device further includes a resilient member, which has a first end connected to the latch and a second opposite end connected to the bridge member.

In another embodiment disclosed herein, the resilient member is an extension spring.

In another embodiment disclosed herein, the latch has a knob, which is disposed through the through hole and protrudes out of an outer surface of the door.

In another embodiment disclosed herein, when the door is assembled to the bottom surface of the main body, the door is moved toward the bottom surface to move the guiding portion of the latch along the inclined surface of the positioning concave area such that the latch is slid along a long axis direction thereof.

In another embodiment disclosed herein, the main body further includes a plurality of receiving cavities on the bottom surface thereof.

In another embodiment disclosed herein, the door further includes a plurality of engaging hooks to be inserted into respective receiving cavities.

Thus, the door design of the portable electronic device disclosed herein only utilize a single door to cover a bottom surface of the main body and the door is equipped with two latches and omitted with conventional bolts or screws so as to reduce the component costs as well as the assembly complexities of the portable electronic device.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
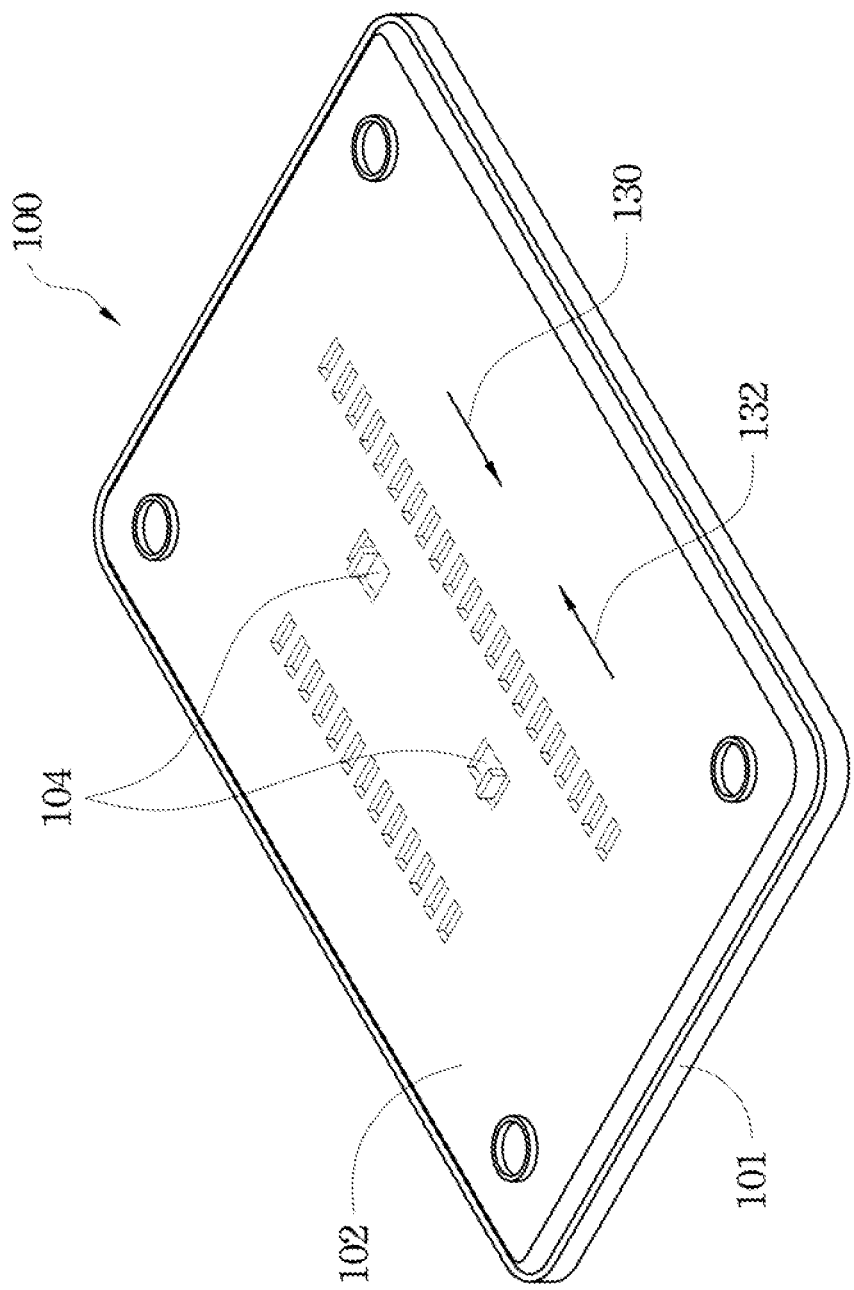
FIG. 1 illustrates a bottom view of a portable electronic device according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
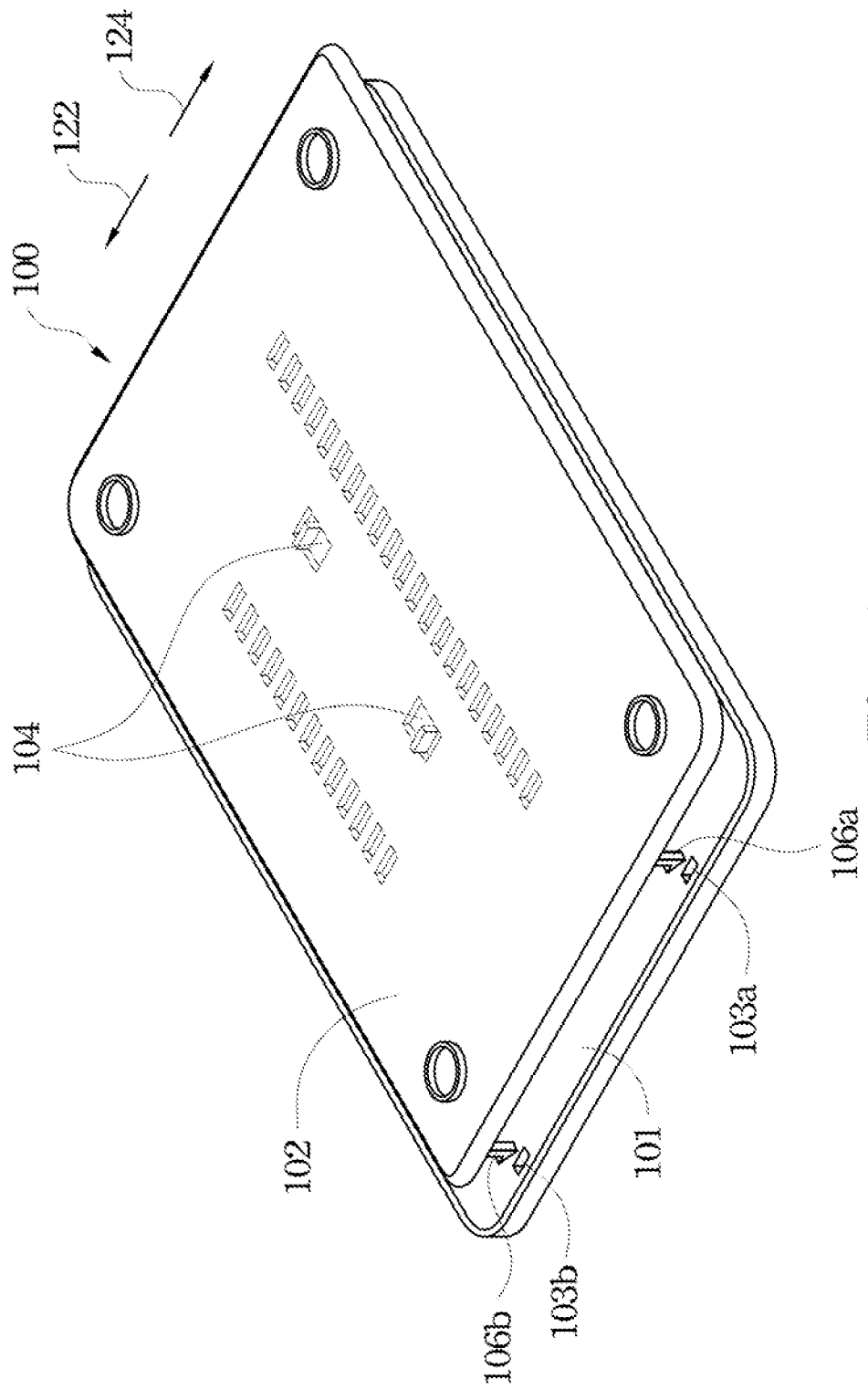
FIG. 2 illustrates the portable electronic device in FIG. 1 with its door removed from its main body.

FIG. 1 illustrates a bottom view of a portable electronic device according to one preferred embodiment of this invention. FIG. 2 illustrates the portable electronic device in FIG. 1 with its door removed from its main body. The portable electronic device 100 includes a main body 101 and a door 102. The door 102 is detachably connected with a bottom surface of the main body 101. The door 102 has a pair of latches 104 to lock or unlock the door 102 to the main body 101. When the door 102 is desired to be assembled to the bottom surface of the main body 101, the door 102 is moved toward the bottom surface of the main body 101 to insert its engaging hooks (106a, 106b), which are located at two edges of the door, into respective receiving cavities (103a, 103b) of the main body 101, and moved along a direction 122 to lock the door 102 to the main body 101. When the door 102 is desired to be removed from the bottom surface of the main body 101, two latches 104 are respectively slid along respective directions (130, 132) to unlock the door 102 and then slid along the direction 124 to remove the door 102.

Figure 3:
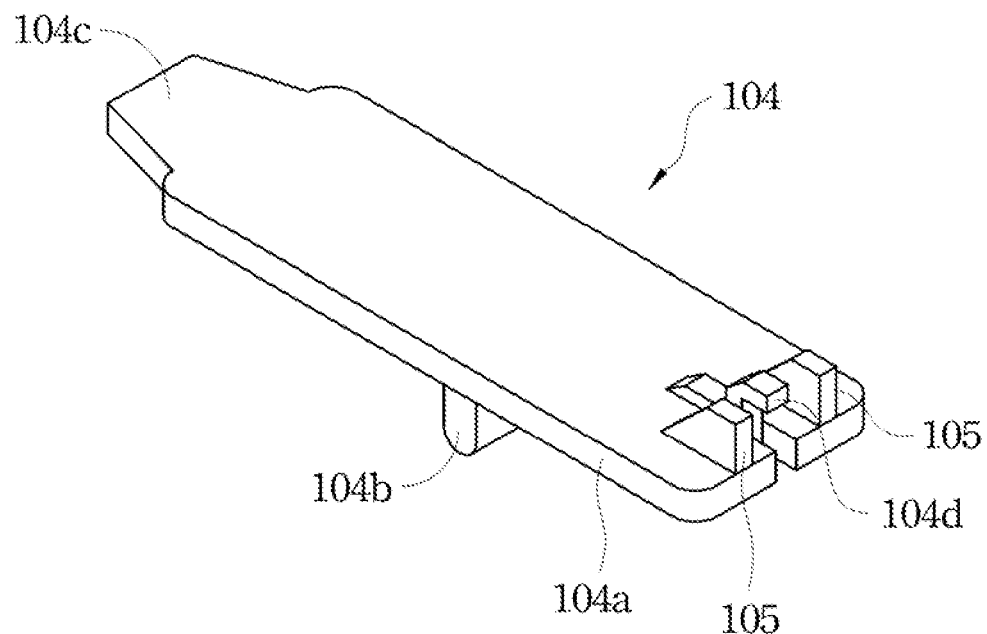
FIG. 3 illustrates a perspective view of a latch in FIG. 1.
Figure 4:
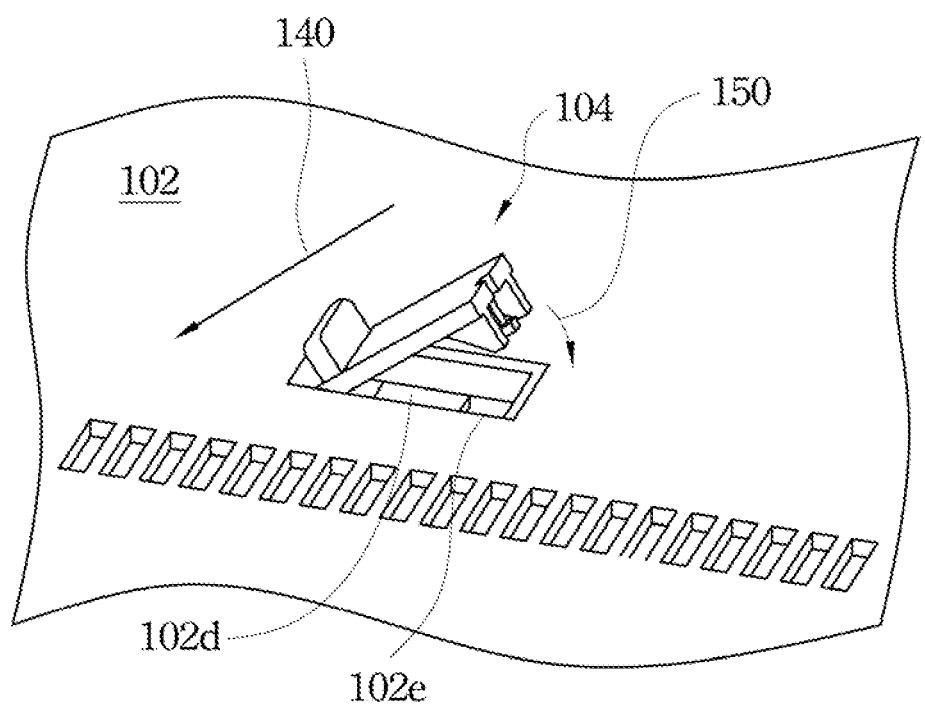
FIG. 4 illustrates the latch in FIG. 3, which is being assembled to the door.

Referring to FIGS. 3 and 4, wherein FIG. 3 illustrates a perspective view of a latch in FIG. 1 and FIG. 4 illustrates the latch in FIG. 3, which is being assembled to the door. The latch body 104a of the latch 104 has an engaging portion 104c at a first end, and a guiding portion 105 and a hook member 104d at a second opposite end. The hook member 104d is located between a pair of guiding portions 105. The latch 104 further includes a knob 104b to be easily pulled or pushed by a user. When the latch 104 is desired to be assembled to the door 102, an engaging portion 104c of the latch 104 is first inserted into the through hole 102e of the door 102 along a direction 140, and then an opposite end of the latch 104 is swiveled along the direction 150 and engaged within the through hole 102e. After the latch 104 is assembled to the door 102, the knob 104b of the latch 104 is inserted through the through hole 102e and protrudes out of an outer surface of the door 102 (referring to both FIG. 1 and FIG. 2 as well). By "the outer surface of the door 102, it denotes an exposed surface of the door 102 when the door 102 is assembled to the main body 101.

Figure 5:
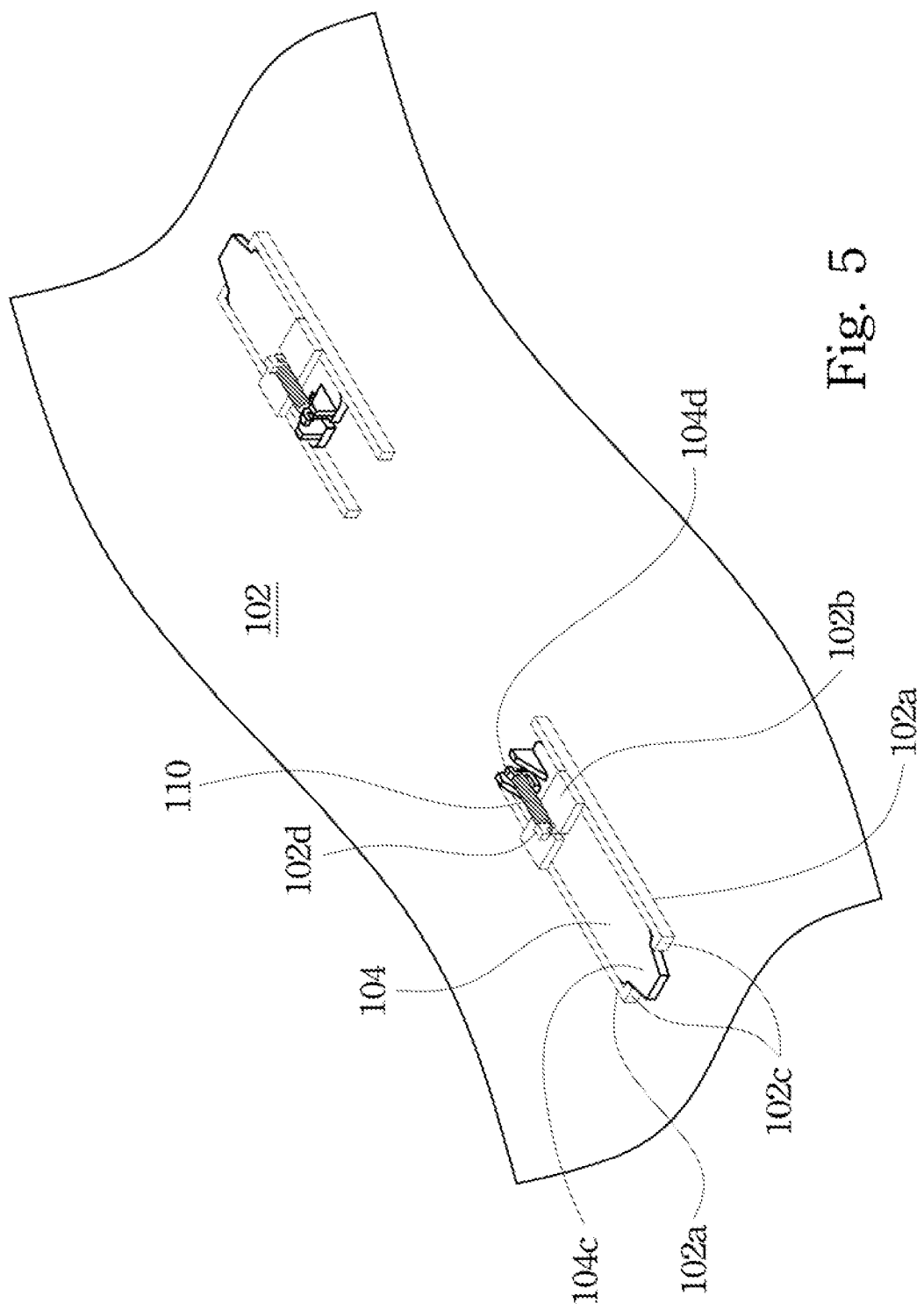
FIG. 5 illustrates the latch in FIG. 3, which has been assembled to the door, from an inner viewpoint.

Referring to FIG. 5, which illustrates the latch in FIG. 3, which has been assembled to the door, form an inner viewpoint. After the latch 104 is assembled within the through hole 102e of the door 102 (referring also to FIG. 5), a resilient member 110 is then installed. An inner surface of the door 102 has a pair of sliding rails 102a and a bridge member 102b. Two sliding rails 102a are located in parallel with each other and at two opposite sides of the through hole 102e. The bridge member 102b is interconnected between the two sliding rails 102a and across the through hole 102e. The bridge member 102b has a hook member 102d to be fastened by the resilient member 110. Therefore, the resilient member 110 has its two opposite ends fastened to the hook member 102d and hook member 104d respectively. In this embodiment, the resilient member 110 is, but not limited to, an extension spring. The two sliding rails 102a permits the latch 104 to be slidable therebetween. The latch 104 is capable of being recovered to an original position by means of the resilient member 110. Each of the two sliding rails 102a has a block member 102c at its end to prevent the latch 104 from sliding out of sliding rails 102a when the latch 104 is pulled by the resilient member 110. By "the inner surface of the door 102, it denotes a surface facing the main body 101 when the door 102 is assembled to the main body 101.

Figure 6:
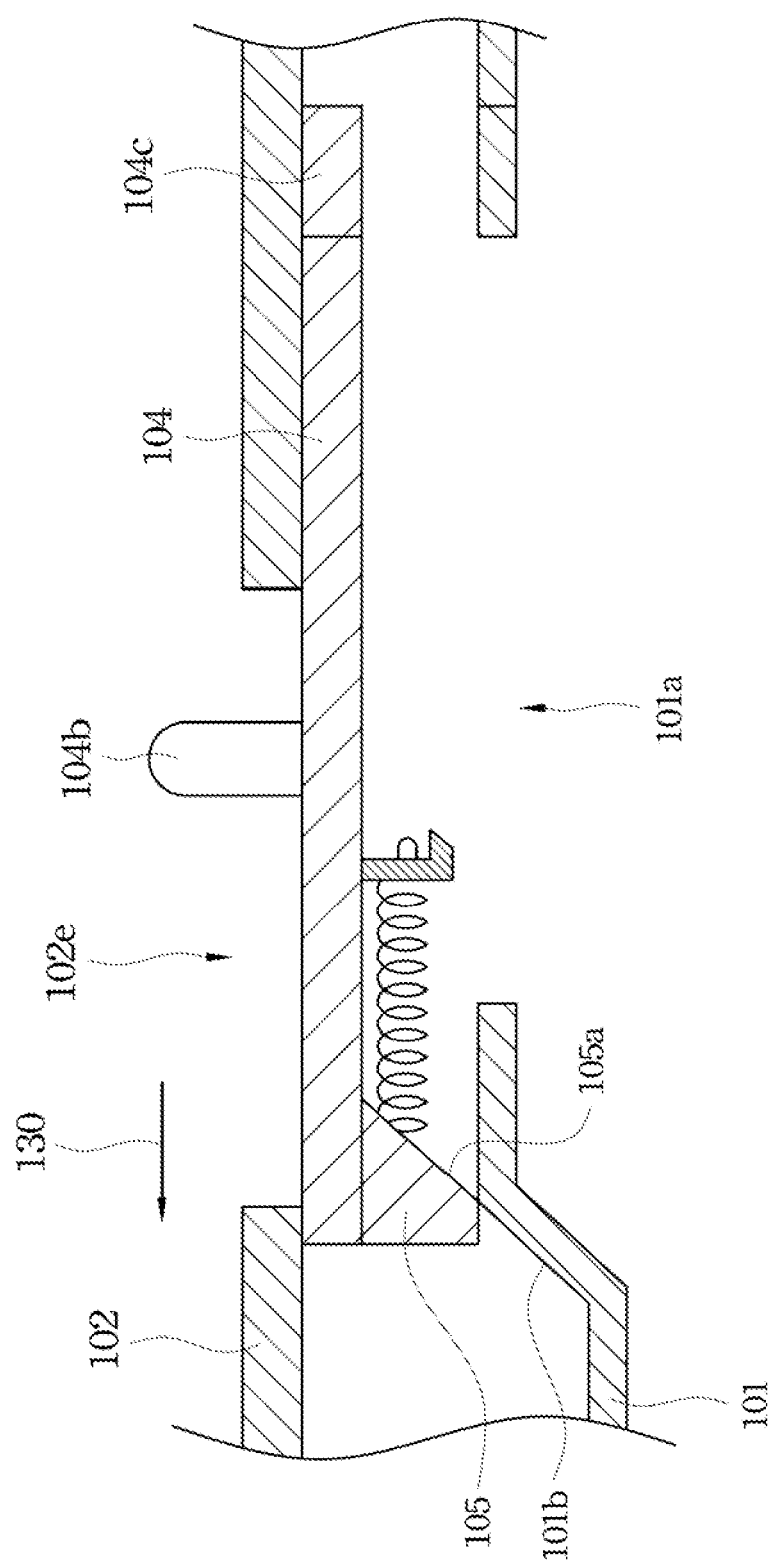
FIG. 6 illustrates a cross-sectional view of the latch and the positioning concave area when the door is assembled to a bottom surface of the main body according to one preferred embodiment of this invention.

Referring to FIG. 6, which illustrates a cross-sectional view of the latch and the positioning concave area when the door is assembled to a bottom surface of the main body according to one preferred embodiment of this invention. When the door 102 is desired to be assembled to the bottom surface of the main body 101, the door 102 is moved toward the main body 101 to move the guide surface 105a of the guiding portion 105 along the inclined surface 101b of the positioning concave area 101a such that the latch 104 can be slid along a direction 130, i.e. a long axis direction of the latch 104.

Figure 7:
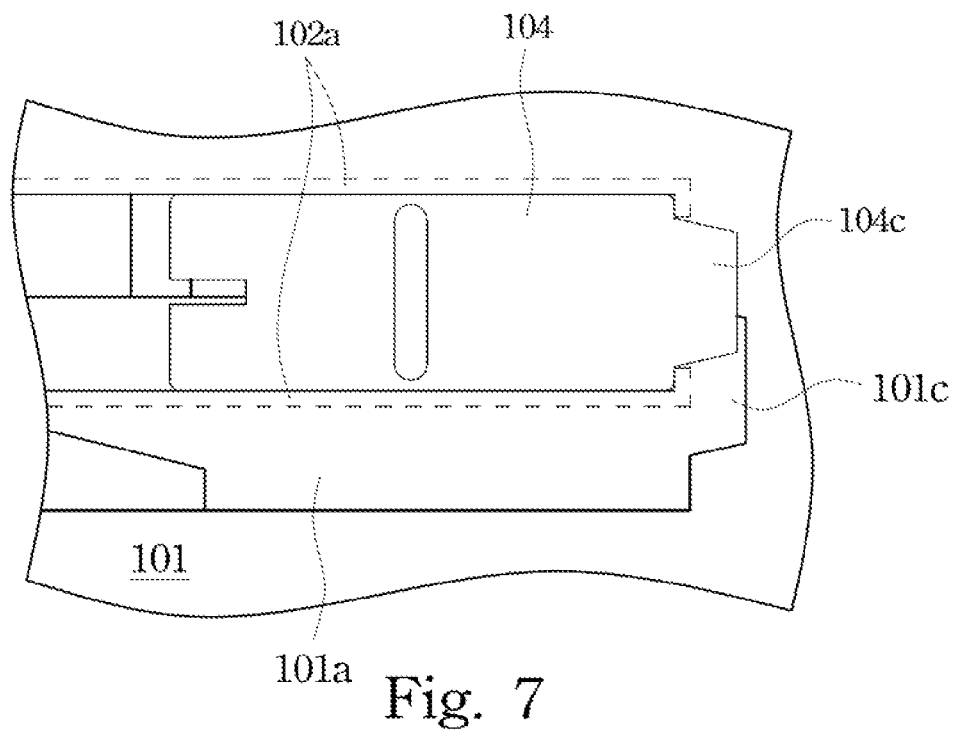
FIGS. 7 and 8 respectively illustrate a top view of the latch and the positioning concave area when the door is assembled to a bottom surface of the main body according to one preferred embodiment of this invention.
Figure 8:
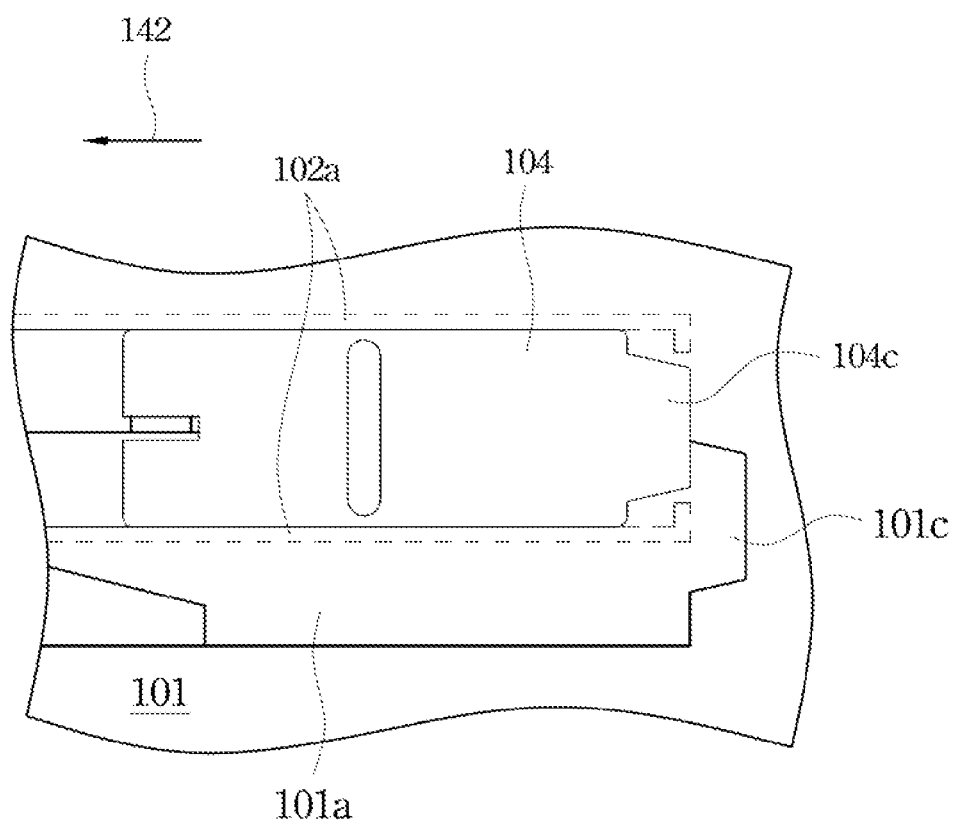

Referring to FIGS. 6-8, wherein FIGS. 7 & 8 respectively illustrate a top view of the latch and the positioning concave area when the door is assembled to a bottom surface of the main body according to one preferred embodiment of this invention. In order to clearly illustrate the latch 104 and positioning concave area 101a, the door 102 is omitted and only the sliding rails 102a (see dashed-lines) of the door is illustrated. When the door 102 is desired to be assembled to the bottom surface of the main body 101, the door 102 is pressed toward the main body 101, the guiding portion 105 of the latch 104 is slid along the inclined surface 101b of the positioning concave area 101a to move the latch 104 along the direction 130 until the latch 104 can engage within the positioning concave area 101a. Then, the door 102 is moved along the direction 122 to cause the engaging portion 104c of the latch 104 to engage with the cutout 101c of the positioning concave area 101a such that the door 102 is locked to the main body 101.

Figure 9:
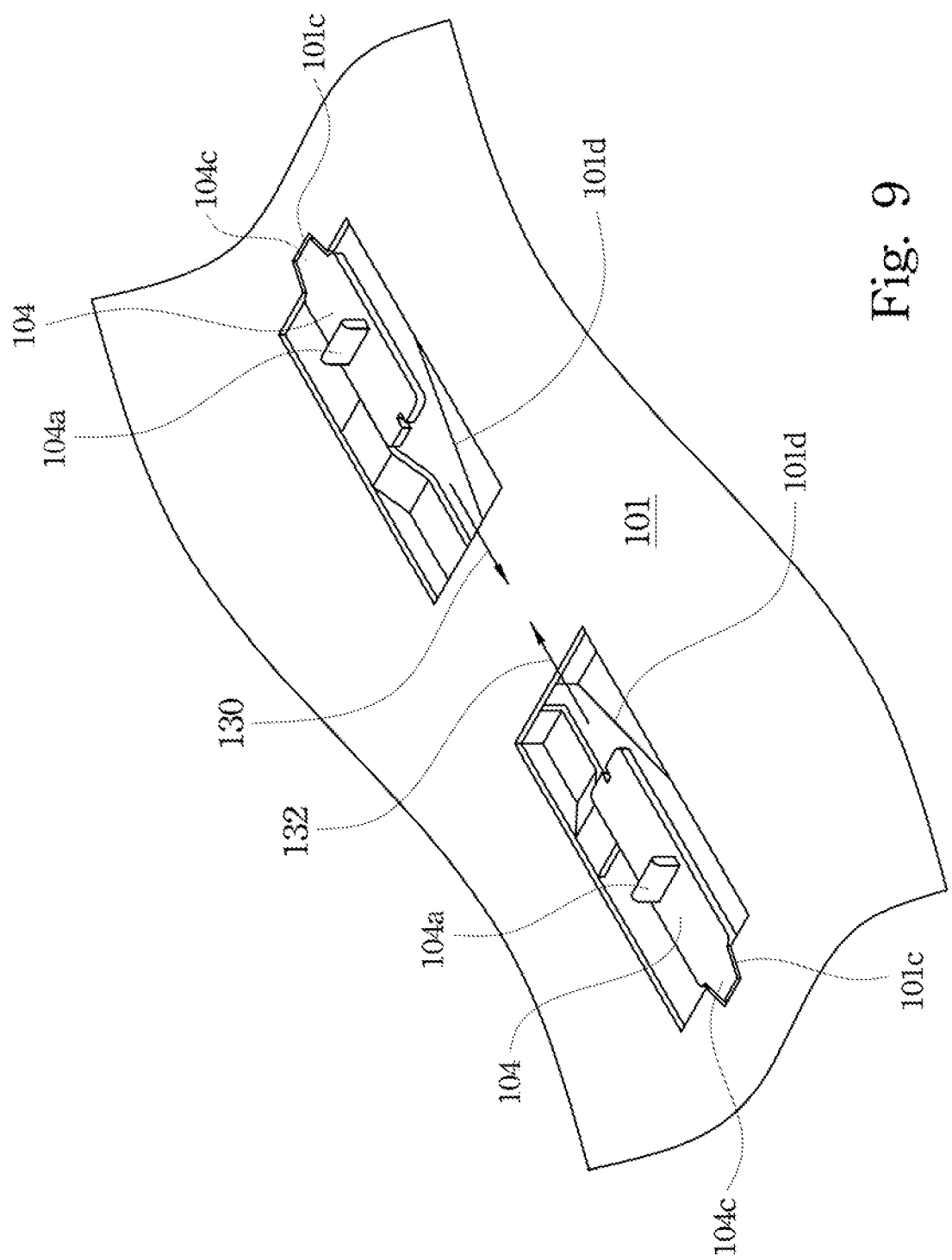
FIG. 9 illustrates the latch operation mechanism of the door, which is being removed from the bottom surface of the main body according to one preferred embodiment of this invention.

Referring to FIG. 9, which illustrates the latch operation mechanism of the door, which is being removed from the bottom surface of the main body according to one preferred embodiment of this invention. In order to clearly illustrate the latch 104 and positioning concave area 101a, all details of the door 102 are omitted except that the latch 104 is illustrated. In this embodiment, an interval between two latches 104 is preferably within a range that two finger of a hand can comfortably reach such that the user can conveniently remove the door with his or her single hand. However, the interval between two latches 104 is not limited to the range that two finger of a hand can reach. When the door is desired to be removed from the bottom surface of the main body, the user can pull the knob 104b of the latch 104 to slid two latches 104 along respective directions (130, 132) such that the engaging portions 104c of the two latches 104 are removed from respective cutouts 101c so as to unlock a horizontal positioning function of the latch 104. At the same time (referring also to FIG. 2), the engaging hooks (106a, 106b) at two sides of the door can be removed from respective receiving cavities (103a, 103b) on the main body 101.

Figure 10:
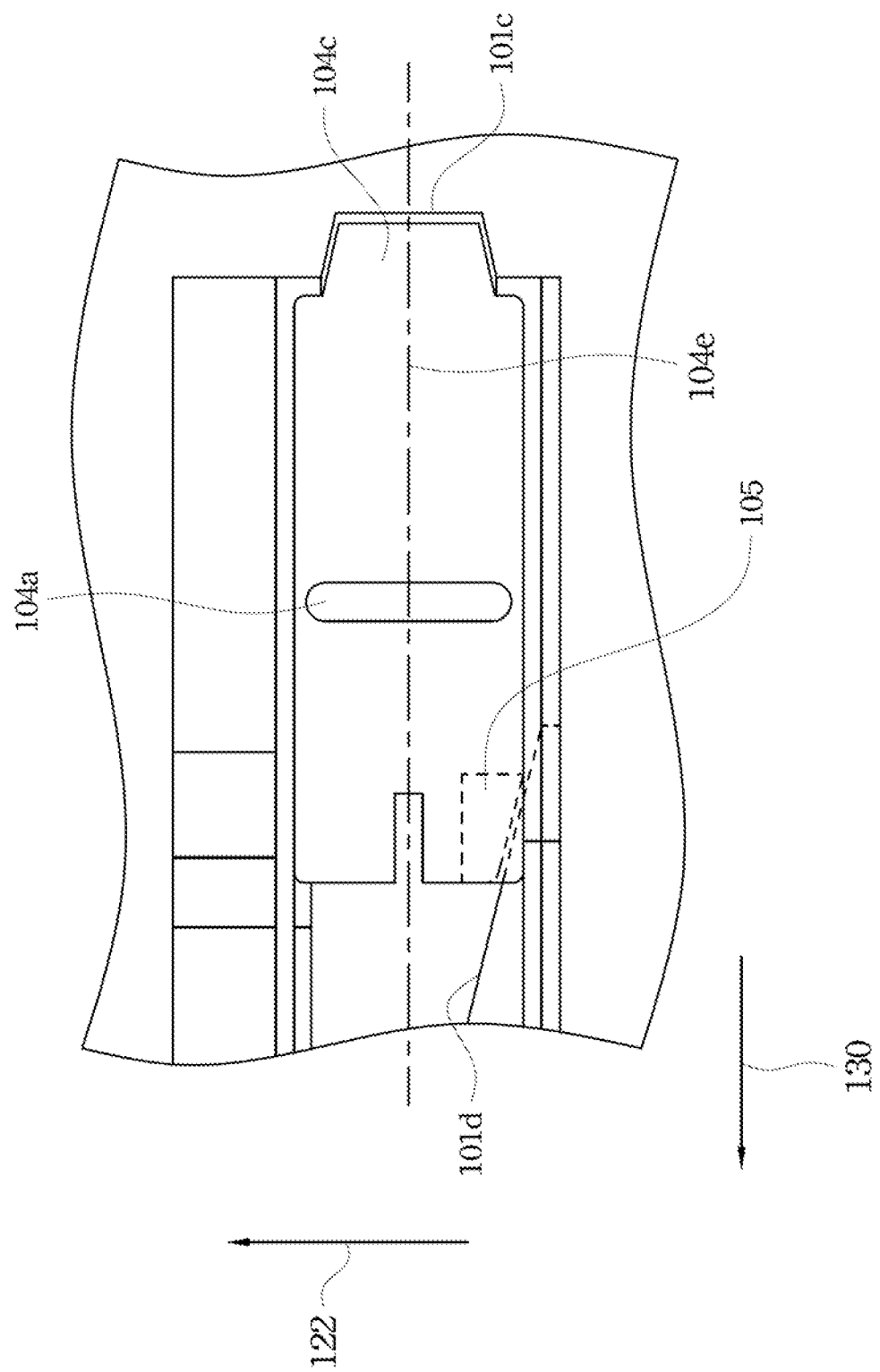
FIG. 10 illustrates an enlarged view of the latch and the positioning concave area in FIG. 9.

FIG. 10 illustrates an enlarged view of the latch and the positioning concave area in FIG. 9. When the user applies a force on the knob 104b of the latch 104 to move the latch 104 along the direction 130 (in parallel with a long axis 104e of the latch 104), the guiding portion 105 of the latch 104 is slid along the guide edge 101d of the positioning concave area so as to move both the door and latch 104 along the direction 122 such that the user can easily remove the door 102 from the bottom surface of the main body 101.

According to the above-discussed embodiments, the door design of the portable electronic device disclosed herein only utilize a single door to cover a bottom surface of the main body and the door is equipped with two latches and omitted with conventional bolts or screws so as to reduce the component costs as well as the assembly complexities of the portable electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device comprising:
   a main body comprising a positioning concave area on a bottom surface thereof, the positioning concave area having a cutout at a first edge, and an inclined surface and a guide edge at a second opposite edge;
   a door being detachably connected with the bottom surface of the main body, the door has a through hole; and
   a latch being slidably connected with the through hole, the latch having an engaging portion at a first end and a guiding portion at a second opposite end;
   when the door is assembled to the bottom surface of the main body, the engaging portion inserts into the cutout,
   when the door is taken apart from the bottom surface of the main body, the engaging portion is removed from the cutout, and the guiding portion slides along the guide edge so as to enable the door to move along a direction that is substantially perpendicular to a long axis of the latch,
   when the door is assembled to the bottom surface of the main body, the door is moved toward the bottom surface to move the guiding portion of the latch along the inclined surface of the positioning concave area such that the latch is slid along a long axis direction thereof.

2. The portable electronic device of claim 1, wherein the door comprising:
   a pair of sliding rails disposed at two opposite sides of the through hole; and
   a bridge member interconnected between the pair of sliding rails and disposed across the through hole.

3. The portable electronic device of claim 2, wherein the latch is slidably connected between the pair of sliding rails.

4. The portable electronic device of claim 3, wherein each of the pair of sliding rails has a block member at an end for preventing the latch from sliding out of the pair of sliding rails.

5. The portable electronic device of claim 3, further comprising a resilient member, which has a first end connected to the latch and a second opposite end connected to the bridge member.

6. The portable electronic device of claim 5, wherein the resilient member is an extension spring.

7. The portable electronic device of claim 2, wherein the latch has a knob, which is disposed through the through hole and protrudes out of an outer surface of the door.

8. The portable electronic device of claim 1, wherein the main body further comprises a plurality of receiving cavities on the bottom surface thereof.

9. The portable electronic device of claim 8, wherein the door further comprises a plurality of engaging hooks to be inserted into respective. receiving cavities.

* * * * *